United States Patent
Horng et al.

(10) Patent No.: US 10,527,045 B2
(45) Date of Patent: Jan. 7, 2020

(54) MOTOR OF A CEILING FAN, THE MOTOR HAVING AN AXIALLY SPACED BEARING, A RADIALLY SPACED BEARING AND A THIRD BEARING

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Kun-Ta Yang, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 83 days.

(21) Appl. No.: 15/865,360

(22) Filed: Jan. 9, 2018

(65) Prior Publication Data

US 2018/0347573 A1 Dec. 6, 2018

(30) Foreign Application Priority Data

May 31, 2017 (TW) .............................. 106117909 A

(51) Int. Cl.
*H02K 5/16* (2006.01)
*F04D 25/06* (2006.01)
(Continued)

(52) U.S. Cl.
CPC ......... *F04D 25/062* (2013.01); *F04D 25/088* (2013.01); *H02K 1/2786* (2013.01); *H02K 1/28* (2013.01); *H02K 5/1737* (2013.01)

(58) Field of Classification Search
CPC .. H02K 5/01; H02K 5/06; H02K 5/15; H02K 5/173; H02K 5/1735; H02K 5/1737; H02K 5/24; H02K 7/14; H02K 7/06; H02K 7/08; H02K 7/081; H02K 7/085; H02K 7/086; H02K 7/088; H02K 7/10; H02K 7/116; H02K 7/1166; H02K 7/1815; H02K 11/33;
(Continued)

(56) References Cited

U.S. PATENT DOCUMENTS

| | | | | |
|---|---|---|---|---|
| 4,878,806 A | * | 11/1989 | Markwardt | F04D 25/088 416/5 |
| 5,065,061 A | * | 11/1991 | Satoh | H02K 5/128 310/104 |

(Continued)

*Primary Examiner* — Mang Tin Bik Lian
*Assistant Examiner* — Maged M Almawri
(74) *Attorney, Agent, or Firm* — Alan D. Kamrath; Karin L. Williams; Mayer & Williams PC

(57) ABSTRACT

A motor of a ceiling fan includes a support unit, a rotor unit, a first bearing, a supporting bearing and a stator unit. The support unit has a shaft. The rotor unit has a rotational connecting member. The rotational connecting member includes a central hole through which the shaft extends, as well as an inner flange extending inwardly of the central hole. The first bearing includes an inner race fit around the shaft and an outer race connected to an inner periphery of the rotational connecting member. The inner and outer races are spaced from each other in a radial direction perpendicular to the shaft. The supporting bearing includes a fixed race fit around the shaft and a rotational race abutting with the inner flange. The fixed race and the rotational race are spaced from each other in an axial direction. The stator unit is connected to the support unit.

11 Claims, 5 Drawing Sheets

(51) Int. Cl.
*F04D 25/08* (2006.01)
*H02K 5/173* (2006.01)
*H02K 1/28* (2006.01)
*H02K 1/27* (2006.01)

(58) Field of Classification Search
CPC ............ H02K 5/16; H02K 5/161; H02K 5/18; H02K 2005/1287; H02K 2213/03
USPC ... 310/99, 98, 83, 90, 90.5, 91, 68 B, 12.31, 310/425, 89; 188/72.1–72.8
See application file for complete search history.

(56) References Cited

U.S. PATENT DOCUMENTS

| | | | | |
|---|---|---|---|---|
| 5,788,023 | A * | 8/1998 | Schoner | F16D 65/00 188/158 |
| 5,831,360 | A * | 11/1998 | Senjo | H02K 1/185 310/80 |
| 5,883,449 | A * | 3/1999 | Mehta | F04D 25/082 310/417 |
| 9,712,003 | B2 * | 7/2017 | Yin | H02K 1/187 |
| 2002/0121824 | A1 * | 9/2002 | Obara | F16C 19/505 310/90 |
| 2005/0155444 | A1 * | 7/2005 | Otaki | B60T 13/746 74/89 |
| 2015/0076972 | A1 * | 3/2015 | Leiber | B60T 13/741 310/68 B |
| 2015/0130308 | A1 * | 5/2015 | Wallace | H02K 21/22 310/78 |
| 2015/0180290 | A1 * | 6/2015 | Yin | H02K 1/187 310/91 |
| 2017/0175774 | A1 | 6/2017 | Yang | |
| 2017/0222503 | A1 * | 8/2017 | Wang | F24F 1/22 |
| 2018/0274546 | A1 * | 9/2018 | Horng | F04D 29/601 |

* cited by examiner

MOTOR OF A CEILING FAN, THE MOTOR HAVING AN AXIALLY SPACED BEARING, A RADIALLY SPACED BEARING AND A THIRD BEARING

CROSS REFERENCE TO RELATED APPLICATIONS

The application claims the benefit of Taiwan application serial No. 106117909, filed on May 31, 2017, and the contents of which are incorporated herein by reference.

BACKGROUND OF THE INVENTION

1. Field of the Invention

The present invention generally relates to a motor and, more particularly, to a motor for use in a ceiling fan.

2. Description of the Related Art

FIG. 1 shows a motor 9 of a conventional ceiling fan, which includes a shaft 91, a stator unit 92, a bearing 93 and a rotor unit 94. The motor 9 is fixed to a ceiling via the shaft 91. The stator unit 92 is coupled with an outer periphery of the shaft 91. The shaft 91 includes a shoulder 911 on which the bearing 93 is positioned. The rotor unit 94 is connected to the bearing 93 in order to rotatably couple with the outer periphery of the shaft 91. An example of such a motor 9 is disclosed in U.S. Patent Publication No. 2017/0175774 entitled "Ceiling Fan Motor Housing and Cover Side Fixing Structure."

In the above structure, since the bearing 93 needs to support the weight of the rotor unit 94 including plural blades thereof (not shown), the bearing 93 needs to have a high load capacity. However, this type of the bearing 93 is very expansive, leading to a difficulty in reducing the cost of the motor 9.

In light of this, it is necessary to improve the motor 9 of the conventional ceiling fan.

SUMMARY OF THE INVENTION

It is therefore the objective of this invention to provide a motor of a ceiling fan where different types of bearings can be used together to firmly support the related components of the ceiling fan, thereby reducing the cost.

In an embodiment, a motor of a ceiling fan includes a support unit, a rotor unit, a first bearing, a supporting bearing and a stator unit. The support unit has a shaft. The rotor unit has a rotational connecting member. The rotational connecting member includes a central hole through which the shaft extends, as well as an inner flange extending inwardly of the central hole. The first bearing includes an inner race fit around the shaft and an outer race connected to an inner periphery of the rotational connecting member. The inner race and the outer race are spaced from each other in a radial direction perpendicular to the shaft. The supporting bearing includes a fixed race fit around the shaft and a rotational race abutting with the inner flange of the rotational connecting member. The fixed race and the rotational race are spaced from each other in an axial direction of the shaft. The stator unit is connected to the support unit.

Based on this, the motor of the ceiling fan according to the invention can significantly reduce the load of the first bearing via the supporting bearing. Therefore, the motor of the ceiling fan according to the invention can attain a secure supporting force for the components of the ceiling fan through the use of a first bearing with a smaller load capacity along with the supporting bearing operating therewith. In this regard, the total cost of the small-load-capacity first bearing and the supporting bearing is still much less than the large-load-capacity bearing used in the motor of the conventional ceiling fan. As a result, the invention can achieve the cost reduction and increase the competitiveness in the market.

In an example, the shaft includes a shoulder, a coupling portion and a narrow portion. The coupling portion is located between the shoulder portion and the narrow portion in an axial direction of the shaft. The inner race of the first bearing abuts with the shoulder portion. The fixed race of the supporting bearing abuts with the coupling portion. The rotational race of the supporting bearing is aligned with but is not in contact with the narrow portion of the shaft. In this arrangement, convenient assembly of the first bearing and the supporting bearing are attained while smooth rotation of the rotational race of the supporting bearing can be maintained.

In an example, the shoulder portion has a minimal diameter larger than an outer diameter of the coupling portion, and the outer diameter of the coupling portion is larger than an outer diameter of the narrow portion. The structure is simple and a convenient manufacturing of the shaft is provided. Also, the installation of the first bearing and the supporting bearing is easy, thereby reducing the cost and improving the convenience in assembly.

In an example, an outer diameter of the shaft gradually increases from the coupling portion to the shoulder portion thereof. This can improve the convenience in assembly of the first bearing.

In an example, an outer diameter of the shaft increases from the narrow portion to the coupling portion. This can improve the convenience in assembly of the supporting bearing.

In an example, the rotational connecting member includes a first end having the inner flange, as well as a second end having a disc portion. The rotor unit further includes a hub fixed to the disc portion. The shoulder portion, the coupling portion and the narrow portion of the shaft are located between the inner flange and the disc portion of the rotational connecting member and are relatively adjacent to the inner flange than to the disc portion. This can improve the convenience in assembly.

In an example, an outer diameter of the supporting bearing is smaller than an inner diameter of the outer race of the first bearing. This can prevent the supporting bearing from interfering with the rotation of the outer race of the first bearing.

In an example, the support unit further includes a buffering member connected between the fixed race of the supporting bearing and the inner race of the first bearing. Thus, the buffering member can provide a secure indirect engagement effect between the first bearing and the supporting bearing.

In an example, the support unit further includes a limiting ring fit around the shaft. The supporting bearing is located between the limiting ring and the first bearing. The limiting ring is not in contact with the rotational race of the supporting bearing. In this arrangement, the limiting ring can prevent the disengagement of the supporting bearing when the shaft is disposed upside down. This also ensures that the limiting ring does not affect the rotation of the rotational race of the supporting bearing.

In an example, the motor of the ceiling fan further including a second bearing spaced from the first bearing. The first bearing is located between the second bearing and the supporting bearing. The second bearing includes an inner race fit around the shaft and an outer race connected to the inner periphery of the rotational connecting member. This structure can improve the smoothness in the rotation of the rotational connecting member and the rotor unit.

In an example, the shaft includes an abutting portion. The inner race of the second bearing includes an end abutting with the abutting portion. This structure can improve the convenience in the assembly.

In an example, the support unit further includes a positioning member fit around the shaft. The positioning member includes an end abutting with another end of the inner race of the second bearing. The stator unit is coupled to the positioning member. The structure permits the positioning member to securely fix the second bearing to a predetermined location of the shaft.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
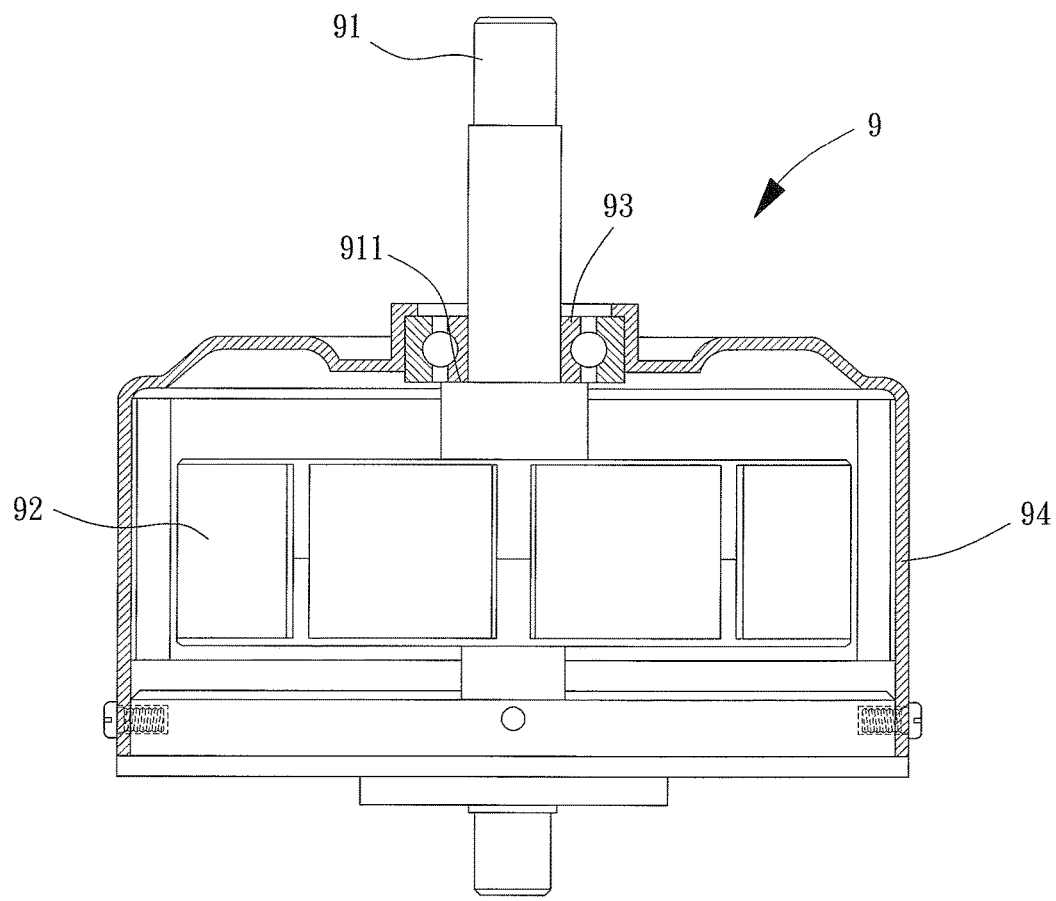
FIG. 1 is a cross-sectional view of a motor of a conventional ceiling fan.

In the various figures of the drawings, the same numerals designate the same or similar parts. Furthermore, when the terms "first", "second", "inner", "outer", "axial", "radial" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
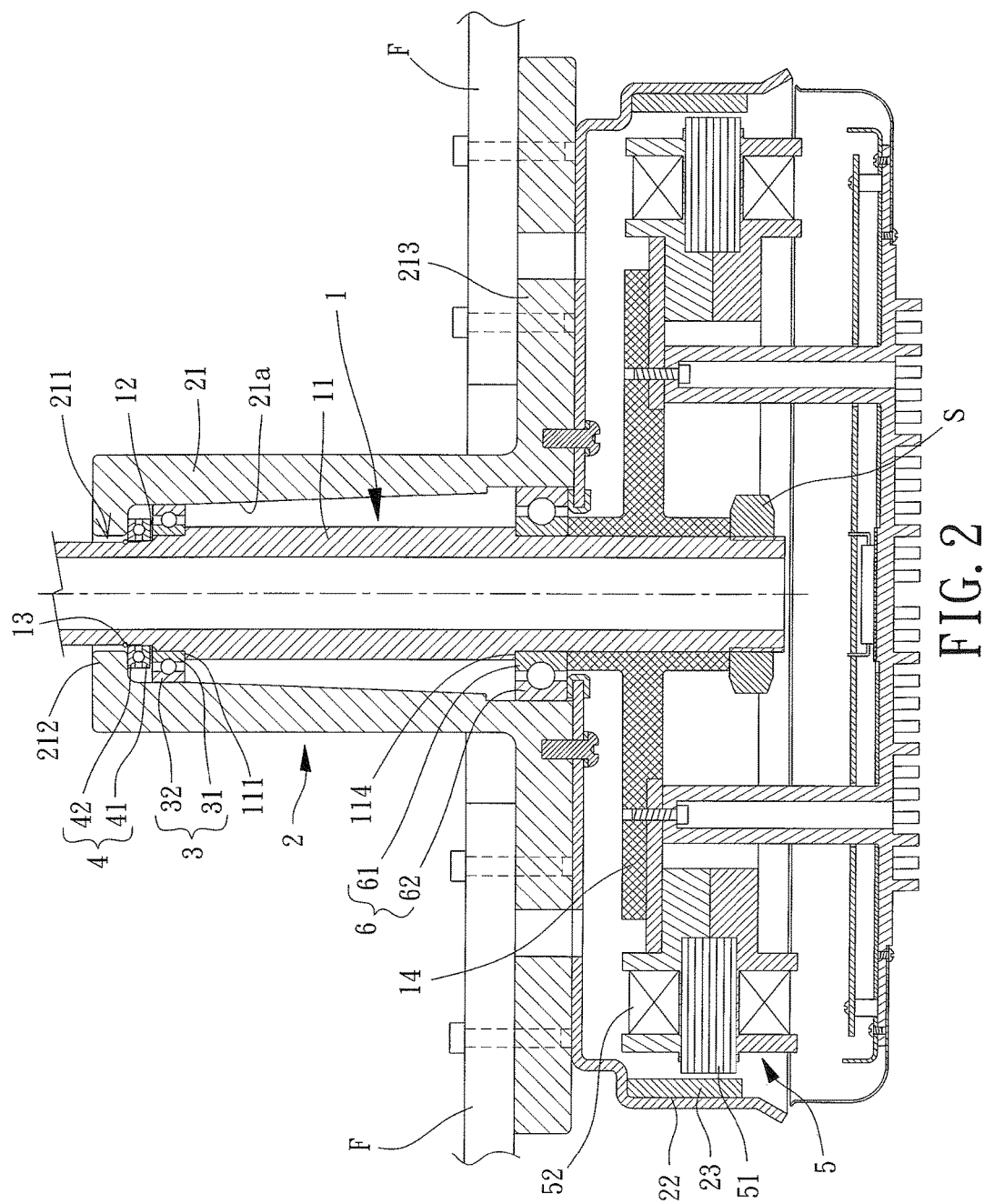
FIG. 2 is a cross-sectional view of a motor of a ceiling fan of a first embodiment according to the invention.

FIG. 2 shows a motor of a ceiling fan of a first embodiment according to the invention. The motor of the ceiling fan includes a support unit 1, a rotor unit 2, a first bearing 3, a supporting bearing 4 and a stator unit 5. The first bearing 3, the supporting bearing 4 and the stator unit 5 are connected to the support unit 1. The rotor unit 2 is connected to the first bearing 3 and the supporting bearing 4 and rotates relative to the support unit 1.

Figure 3:
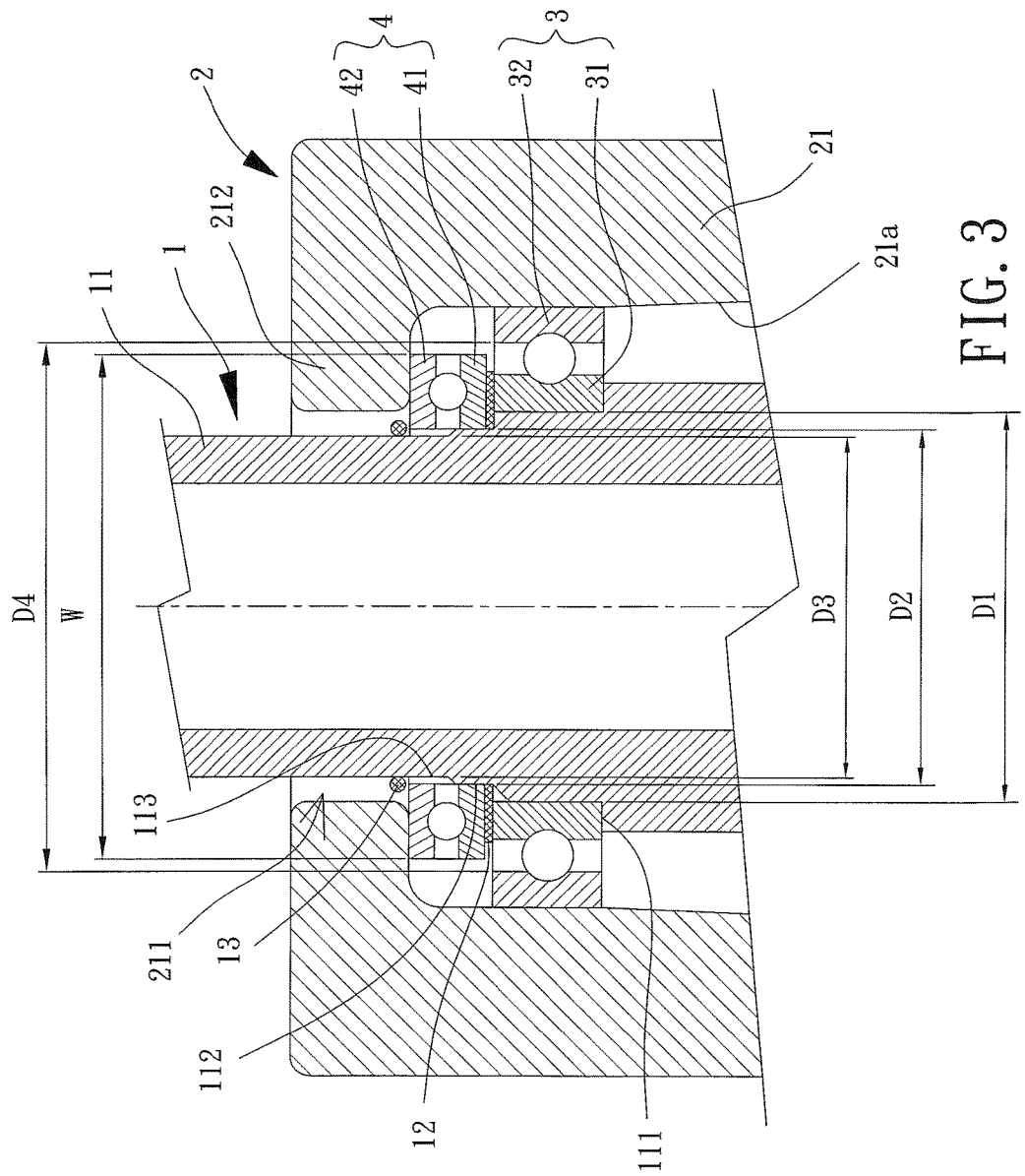
FIG. 3 is a partially enlarged view of FIG. 2.

Referring to FIGS. 2 and 3, the support unit 1 includes a shaft 11 configured to be fixed to a ceiling. The shaft 11 includes a shoulder portion 111, a coupling portion 112 and a narrow portion 113. In an axial direction of the shaft 11, the coupling portion 112 is located between the shoulder portion 111 and the narrow portion 113. The shoulder portion 111 has a minimal diameter D1 larger than an outer diameter D2 of the coupling portion 112. The outer diameter D2 of the coupling portion 112 is larger than an outer diameter D3 of the narrow portion 113. The first bearing 3 couples with the shoulder portion 111. The supporting bearing 4 couples with the coupling portion 112. The support unit 1 further includes a buffering member 12 which is elastomeric and fit around the outer periphery of the shaft 11, such as a pad made of rubber or the like. The buffering member 12 is connected to the first bearing 3 and the supporting bearing 4.

It is noted that the portion of the coupling portion 112 that connects to the shoulder portion 111 can be in an inclined or curved form. Namely, the outer diameter of the shaft 11 increases from the coupling portion 112 to the shoulder portion 111. This can enhance the convenience in assembly of the first bearing 3. Similarly, the portion of the narrow portion 113 that connects to the coupling portion 112 can be in an inclined or curved form. Namely, the outer diameter of the shaft 11 increases from the narrow portion 113 to the coupling portion 112. This can enhance the convenience in assembly of the supporting bearing 4.

The rotor unit 2 is rotatably coupled with the outer periphery of the shaft 11. The rotor unit 2 includes a rotational connecting member 21 having a central hole 211. The shaft 11 extends through the central hole 211. The rotational connecting member 21 includes an inner flange 212 radially extending inwardly of the central hole 211. In this embodiment, the rotational connecting member 21 is a sleeve. The rotational connecting member 21 includes a first end having the inner flange 212, as well as a second end having a disc portion 213 extending outwards. Thus, the blades F and a hub 22 of the rotor unit 2 can be fixed to the disc portion 213. In this arrangement, the hub 22, the blades F and the rotational connecting member 21 can jointly rotate about the shaft 11. The shoulder portion 111, the coupling portion 112 and the narrow portion 113 are located between the inner flange 212 and the disc portion 213 and are relatively adjacent to the inner flange 212. The rotor unit 2 further includes a permanent magnet unit 23 mounted to an inner face of the hub 22.

The first bearing 3 includes an inner race 31 and an outer race 32. The inner race 31 is fit around the shaft 11 and abuts with the shoulder portion 111. The outer race 32 is connected to an inner periphery 21a of the rotational connecting member 21, permitting the rotational connecting member 21 and the outer race 32 to rotate relative to the inner race 31.

The supporting bearing 4 includes a fixed race 41 and a rotational race 42. The fixed race 41 is fit around the shaft 11 and abuts with the coupling portion 112. The rotational race 42 abuts with the inner flange 212 of the rotational connecting member 21. The rotational race 42 is aligned with but is not in contact with the narrow portion 113 of the shaft 11. Thus, the fixed race 41 of the supporting bearing 4 is kept in contact with the shaft 11 while the rotational race 42 of the supporting bearing 4 is in support of the rotational connecting member 21 when rotating together with the rotational connecting member 21 relative to the shaft 11. Furthermore, the buffering member 12 of the support unit 1 is connected between the fixed race 41 of the supporting bearing 4 and the inner race 31 of the first bearing 3 to provide a secure indirect engagement effect therebetween.

In the embodiment, the inner race 31 and the outer race 32 are aligned with each other in a radial direction, and the fixed race 41 and the rotational race 42 are aligned with each other in the axial direction. In this arrangement, the convenient assembly can be provided. Also, the rotational race 42 increases the contact area between the supporting bearing 4 and the rotational connecting member 21. Thus, the rotor unit 2 and the blades F can be securely supported by the supporting bearing 4. To prevent the supporting bearing 4 from interfering with the rotation of the outer race 32 of the first bearing 3, an outer diameter W of the supporting bearing 4 is preferably smaller than an inner diameter D4 of the outer race 32 of the first bearing 3. The support unit 1 further includes a limiting ring 13. The limiting ring 13 can be an O-ring, for example. The limiting ring 13 is fit around the shaft 11, such that the supporting bearing 4 is located between the limiting ring 13 and the first bearing 3. The limiting ring 13 is not in contact with the rotational race 42 of the supporting bearing 4 such that the limiting ring 13 can prevent the disengagement of the supporting bearing 4 when the shaft 11 is disposed upside down. This also prevents the limiting ring 13 from adversely affecting the rotational smoothness of the rotational race 42 of the supporting bearing 4.

The stator unit 5 is connected to the support unit 1 and includes an iron core 51 fit around the shaft 11. The iron core 51 is wound with a coil unit 52. The iron core 51 and the coil unit 52 of the stator unit 5 are covered by the hub 22 of the rotor unit 2 to prevent exposure of the iron core 51 and the coil unit 52. The iron core 51 and the permanent magnet unit 23 of the rotor unit 2 can face each other to form a gap for magnetic induction.

The motor of the ceiling fan according to the invention can further include a second bearing 6 spaced from the first bearing 3. The first bearing 3 is located between the second bearing 6 and the supporting bearing 4 in the axial direction. The second bearing 6 includes an inner race 61 and an outer race 62. The inner race 61 is fit around the shaft 11, and the outer race 62 is connected to the inner periphery 21a of the rotational connecting member 21. In this arrangement, the rotational connecting member 21, the outer race 32 of the first bearing 3, and the outer race 62 of the second bearing 6 can rotate jointly relative to the shaft 11.

In this embodiment, the shaft 11 includes an abutting portion 114 which is relatively adjacent to the disc portion 213 of the rotational connecting member 21 and is relatively distant to the inner flange 212 of the rotational connecting member 21. Thus, the inner race 61 of the second bearing 6 includes an end abutting with the abutting portion 114. The support unit 1 further includes a positioning member 14 fit around the shaft 11. The positioning member 14 includes an end abutting with another end of the inner race 61 of the second bearing 6, as well as another end abutted by a fastener S. Thus, the positioning member 14 is able to securely fix the second bearing 6 to a predetermined location of the shaft 11, permitting the stator unit 5 to be directly or indirectly fixed to the positioning member 14.

In summary, the motor of the ceiling fan according to the invention can significantly reduce the load of the first bearing 3 via the supporting bearing 4. Therefore, the motor of the ceiling fan according to the invention can attain a secure supporting force for the components of the ceiling fan through the use of the first bearing 3 with a smaller load capacity along with the supporting bearing 4 operating therewith. In this regard, the total cost of the small-load-capacity first bearing 3 and the supporting bearing 4 is still much less than the large-load-capacity bearing used in the motor of the conventional ceiling fan. Thus, the application can reduce the overall cost of the motor of the ceiling fan, increasing the competitiveness in the market.

Figure 4:
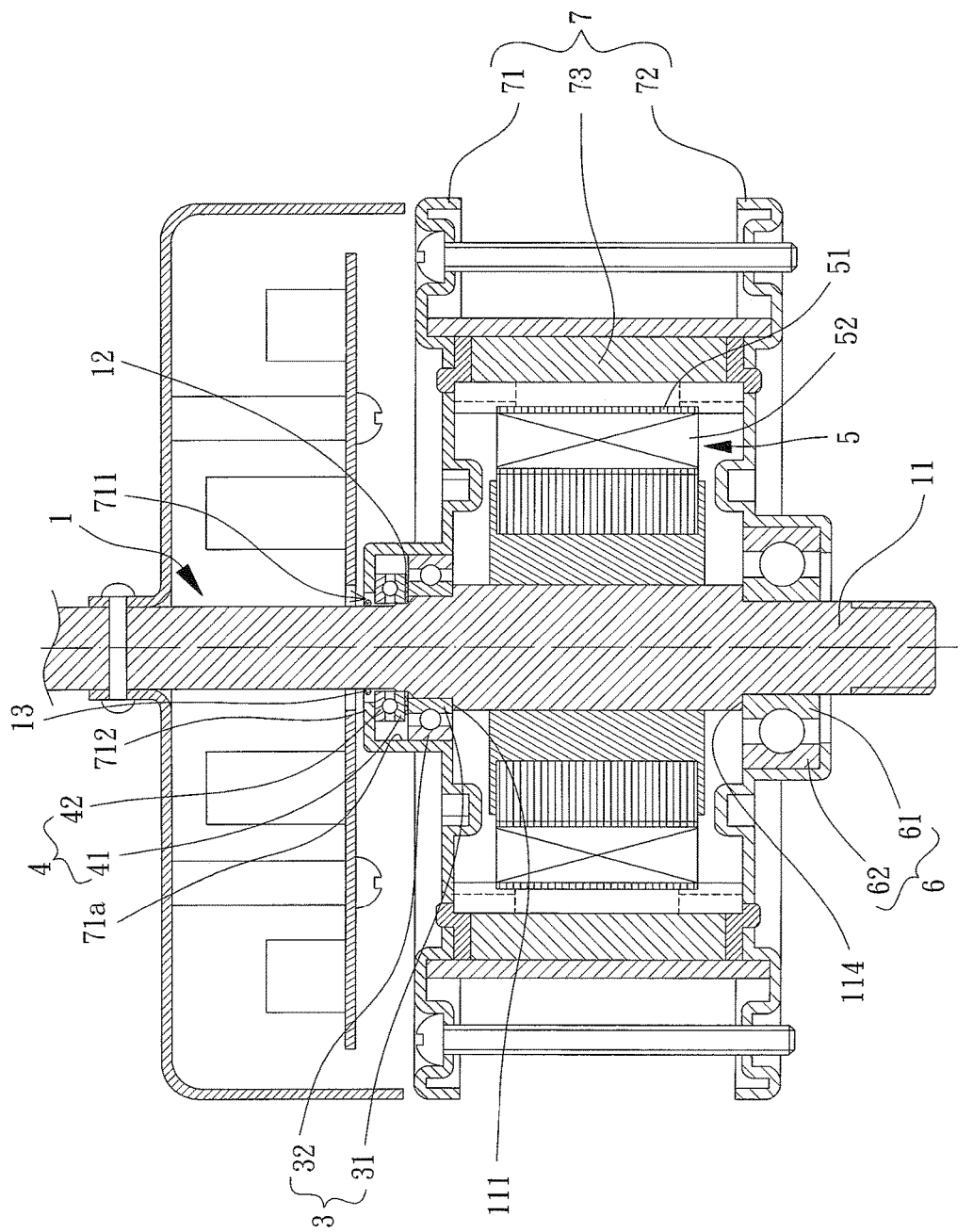
FIG. 4 is a cross-sectional view of a motor of a ceiling fan of a second embodiment according to the invention.

FIG. 4 shows a motor of a ceiling fan of a second embodiment according to the invention. The second embodiment of the invention is substantially the same as the first embodiment except for the shape of a rotor unit 7.

Specifically, the rotor unit 7 includes a rotational connecting member 71. The rotational connecting member 71 includes a central hole 711 through which the shaft 11 of the support unit 1 extends. In this embodiment, the rotational connecting member 71 is in the form of a disc. The rotational connecting member 71 further includes an inner flange 712 abutting with the rotational race 42 of the supporting bearing 4 and the outer race 32 of the first bearing 3 abuts with an inner periphery 71a of the rotational connecting member 71. Besides, the rotor unit 7 further includes an auxiliary disc 72 and a permanent magnet unit 73. The auxiliary disc 72 is coupled with the outer race 62 of the second bearing 6. The rotational connecting member 71 and the auxiliary disc 72 are fixed together. In this arrangement, the permanent magnet unit 73 is securely sandwiched between the rotational connecting member 71 and the auxiliary disc 72 while facing the iron core 51 of the stator unit 5.

Figure 5:
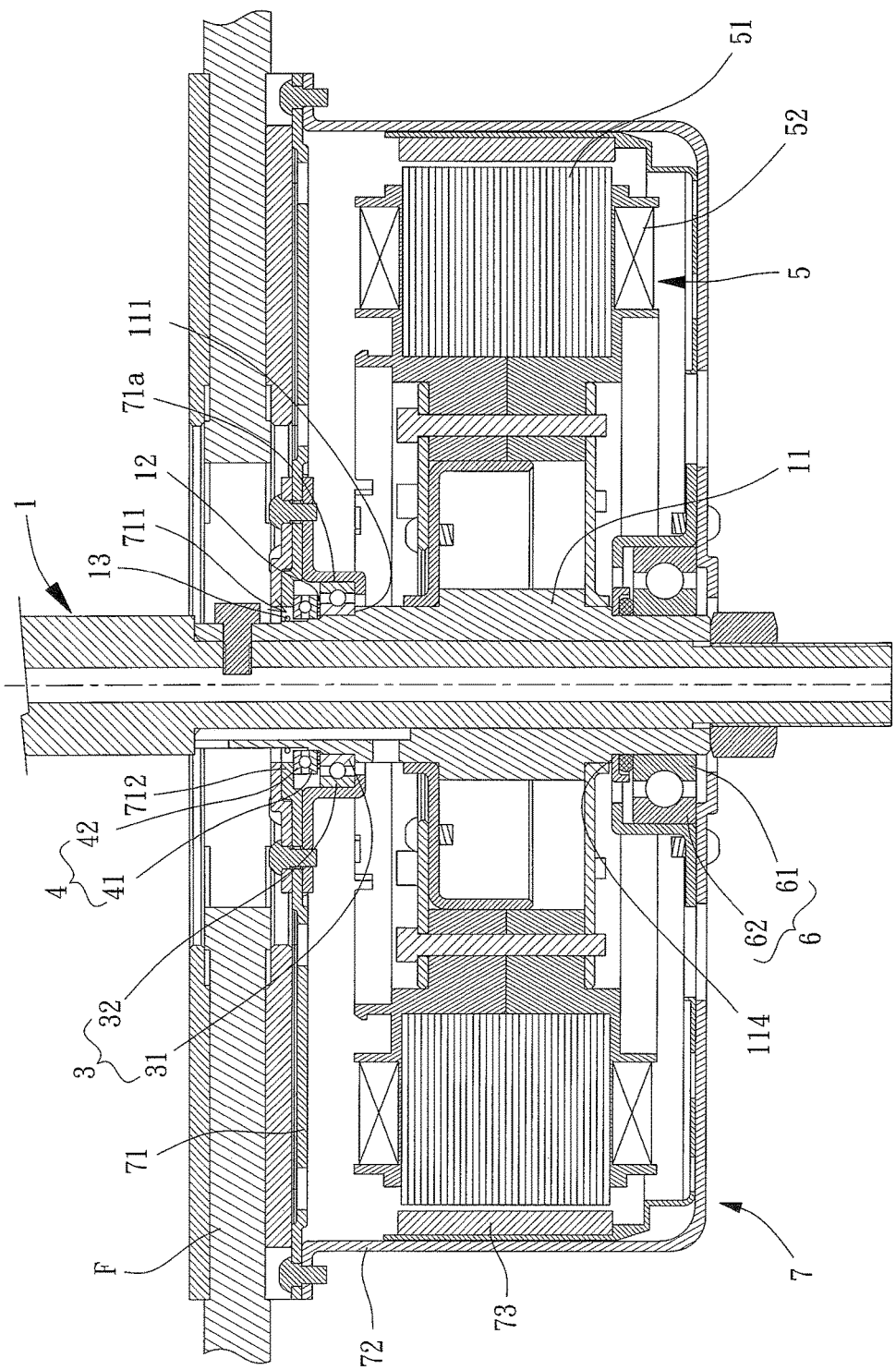
FIG. 5 is a cross-sectional view of a motor of a ceiling fan of a third embodiment according to the invention.

Based on this, the motor of the ceiling fan of the second embodiment according to the invention can also achieve the cost reduction and can increase the competitiveness in the market. It is worth mentioning that the rotational connecting member 71 in this embodiment is not limited to the disc shown in FIG. 4 and can consist of a plurality of elements such as discs, pads, clamping elements and fasteners (as shown in FIG. 5) which assist in secure engagement between the first bearing 3 and the supporting bearing 4. However, this is not used to limit the invention.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor of the ceiling fan, comprising:
    a support unit having a shaft, wherein the shaft includes a shoulder portion, a coupling portion and a narrow portion, wherein the coupling portion is located between the shoulder portion and the narrow portion in the axial direction of the shaft;
    a rotor unit having a rotational connecting member, wherein the rotational connecting member includes a central hole through which the shaft extends, with the rotational connecting member further including an inner flange extending inwardly of the central hole;
    a first bearing including an inner race fit around the shaft and an outer race connected to an inner periphery of the rotational connecting member, wherein the inner race and the outer race are spaced from each other in a radial direction perpendicular to the shaft, wherein the inner race of the first bearing abuts with the shoulder portion;
    a supporting bearing including a fixed race fit around the shaft and a rotational race abutting with the inner flange of the rotational connecting member, wherein the fixed race and the rotational race are spaced from each other in an axial direction of the shaft, wherein the fixed race of the supporting bearing abuts with the coupling portion, and wherein the rotational race of the supporting bearing is aligned with but is not in contact with the narrow portion of the shaft; and
    a stator unit connected to the support unit.

2. The motor of the ceiling fan as claimed in claim 1, wherein the shoulder portion has a minimal diameter larger than an outer diameter of the coupling portion, and the outer diameter of the coupling portion is larger than an outer diameter of the narrow portion.

3. The motor of the ceiling fan as claimed in claim 1, wherein an outer diameter of the shaft gradually increases from the coupling portion to the shoulder portion thereof.

4. The motor of the ceiling fan as claimed in claim 1, wherein an outer diameter of the shaft gradually increases from the narrow portion to the coupling portion.

5. The motor of the ceiling fan as claimed in claim 1, wherein the rotational connecting member includes a first end having the inner flange, as well as a second end having a disc portion, wherein the rotor unit further includes a hub fixed to the disc portion, and wherein the shoulder portion, the coupling portion and the narrow portion of the shaft are located between the inner flange and the disc portion of the rotational connecting member and are relatively adjacent to the inner flange than to the disc portion.

6. The motor of the ceiling fan as claimed in claim 1, wherein an outer diameter of the supporting bearing is smaller than an inner diameter of the outer race of the first bearing.

7. The motor of the ceiling fan as claimed in claim 1, wherein the support unit further includes a buffering member connected between the fixed race of the supporting bearing and the inner race of the first bearing.

8. The motor of the ceiling fan as claimed in claim 1, wherein the support unit further includes a limiting ring fit around the shaft, wherein the supporting bearing is located between the limiting ring and the first bearing, and wherein the limiting ring is not in contact with the rotational race of the supporting bearing.

9. The motor of the ceiling fan as claimed in claim 1, further including a second bearing spaced from the first bearing, wherein the first bearing is located between the second bearing and the supporting bearing, and wherein the second bearing includes an inner race fit around the shaft and an outer race connected to the inner periphery of the rotational connecting member.

10. The motor of the ceiling fan as claimed in claim 9, wherein the shaft includes an abutting portion, and wherein the inner race of the second bearing includes an end abutting with the abutting portion.

11. The motor of the ceiling fan as claimed in claim 10, wherein the support unit further includes a positioning member fit around the shaft, wherein the positioning member includes an end abutting with another end of the inner race of the second bearing, and wherein the stator unit is coupled to the positioning member.

* * * * *